(12) United States Patent
Burkholder

(10) Patent No.: US 7,546,190 B2
(45) Date of Patent: Jun. 9, 2009

(54) ADAPTIVE DEAD-ZONE COMPENSATION FOR STEERING SYSTEMS

(75) Inventor: Jason O. Burkholder, Ruckersville, VA (US)

(73) Assignee: Northrop Grumman Systems Corp., Los Angeles, CA (US)

( * ) Notice: Subject to any disclaimer, the term of this patent is extended or adjusted under 35 U.S.C. 154(b) by 600 days.

(21) Appl. No.: 11/216,491

(22) Filed: Aug. 31, 2005

(65) Prior Publication Data

US 2007/0050113 A1 Mar. 1, 2007

(51) Int. Cl.
*B62D 6/00* (2006.01)
(52) U.S. Cl. .............................. 701/41; 701/1; 701/21; 701/42; 700/28; 700/29; 700/30; 700/31; 180/6.2; 180/7.3; 180/7.4; 340/987; 340/146.2; 440/53; 440/61 S; 116/31
(58) Field of Classification Search .................. 701/41, 701/1, 21, 42; 700/28, 29, 30, 31; 180/6.2, 180/7.3, 7.4; 340/987, 146.2; 440/53, 61 S
See application file for complete search history.

(56) References Cited

U.S. PATENT DOCUMENTS

| | | | | |
|---|---|---|---|---|
| 4,954,732 A | * | 9/1990 | Surauer et al. .............. 327/552 |
| 5,268,834 A | * | 12/1993 | Sanner et al. ................. 700/31 |
| 5,768,121 A | * | 6/1998 | Federspiel .................... 700/28 |
| 5,901,059 A | * | 5/1999 | Tao et al. ....................... 700/29 |
| 6,272,409 B1 | * | 8/2001 | Elwood ........................ 701/41 |
| 7,085,688 B1 | * | 8/2006 | Sumida et al. ................. 703/2 |
| 7,177,710 B2 | * | 2/2007 | Calise et al. .................. 700/28 |
| 2004/0017255 A1 | * | 1/2004 | Goren et al. ................ 330/149 |

OTHER PUBLICATIONS

Gang Tao, Adapative Output Dead-Zone Compensation, Dec. 1997, IEE.*
Tomonobu Senjyu, Position Control of Ultrasonic Motors Using MRAC with Dead-Zone Compensation, Dec. 2001, IEEE.*
Taware et al., Jun. 2001, Proceedings of the American Control Conference, pp. 2456-2461.*

* cited by examiner

*Primary Examiner*—Khoi Tran
*Assistant Examiner*—Nikhil Sriraman
(74) *Attorney, Agent, or Firm*—Seymour Levine, Esq.

(57) ABSTRACT

A method for compensating a steering system exhibiting dead-zone characteristics estimates the dead-zone parameters of the steering system and establishes a dead-zone inverse function utilizing the estimated parameters. The dead-zone inverse is utilized to transform steering orders in the dead-zone. Parameters of the dead-zone inverse are continuously up-dated with the utilization of the transformed steering order, the existing dead-zone parameters, and the present heading.

6 Claims, 4 Drawing Sheets

ADAPTIVE DEAD-ZONE COMPENSATION FOR STEERING SYSTEMS

BACKGROUND OF THE INVENTION

1. Field of the Invention

The invention pertains to automatic steering control of marine vessels, and more particularly to compensation for steering systems that exhibit dead-zone characteristics.

2. Description of the Prior Art

Marine high-speed craft frequently use water jets for combined propulsion and steering. These systems utilize paddles that straddle the water jets. When the paddles are rotated the water streams from the jets are deflected causing the craft to change direction. These devices, however, may exhibit a steering dead-zone. Helm orders for small angular turns produce small angular rotations of the paddles with a concomitant small or zero deflection of the water stream, which may be insufficient to steer the craft. This creates a major control problem, particularly for an autopilot in a course maintaining mode wherein it is continuously making small course corrections. The problem is exacerbated for high speed craft, which are especially prone to instability in maintaining heading due to the dead-zone problem. An uncompensated or improperly compensated dead-zone always results in reduced heading keeping accuracy, longer and less fuel efficient voyages, and a less comfortable ride for passengers and crew.

A dead-zone is characterized by four parameters: the extent of the dead-zone band on either side of zero plus a slope in each direction respectively extending from the ends of the dead-zone. Some prior art marine autopilots for high speed craft utilize the inverse of the dead-zone function to provide dead-zone compensation. These systems, however, require dead-zone parameters which are functions of the speed of the craft, sea conditions, and other factors. At each installation on a vessel, the operator or engineer must go through trial and error searches to establish dead-zone parameters for various operating conditions. The determination of the dead-zone parameters is labor intensive and require trained personnel. Further, during operation the prevailing conditions must be established before the appropriate parameter is applied. The selection of the parameters assumes that the dead-zone is symmetric about zero and the slopes in either direction are known. Additionally, it assumes that the dead-zone characteristic does not change with changes in speed or other vessel changes such as loading. Requiring an operator or engineer to determine the four parameters by trial and error and the operator to constantly update them based on changes in ship operating characteristics is too demanding to be at all practical.

Other prior art system set-up strategies reduce the water jet nozzle diameter to increase the diameter of the water flow, thus providing a greater water stream coverage of the paddles and a greater turning moment and/or offsetting the outboard waterjets in outboard direction so that for small turning angles there is a reduced, but non-zero turning moment from one water jet. Either of these solutions result in reduced propulsion efficiency and performance and, therefore, are not desired by the vessel operator.

SUMMARY OF THE INVENTION

In accordance with the present invention an adaptive inverse is provided by iterating estimates of all four dead-zone parameters thereby implementing the dead-zone inverse for the prevailing operating characteristics. The iterations do not require any manual input by the operator or any performance reducing adjustments to the water jet propulsion. It compensates for asymmetric and time varying dead-zones without encumbering the operator.

The invention will now be described in greater detail with reference to the accompanying drawings.

DESCRIPTION OF THE PREFERRED EMBODIMENTS

Figure 1:
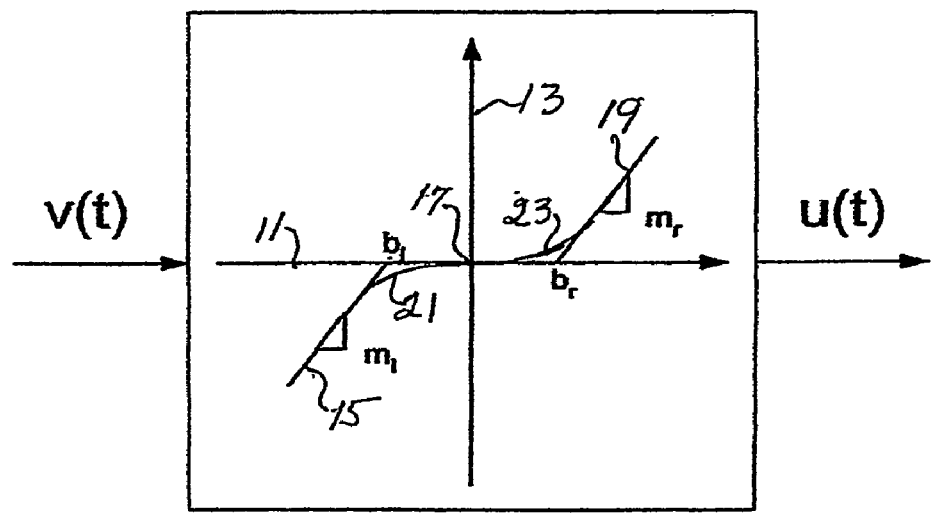
FIG. 1 is a graphical representation of a dead-zone function.

A representation of a steering system response to a steering command is shown in FIG. 1. Upon reception of a heading order r(t), a helm order V(t) is established, represented by the ordinate 11, and a rudder turning moment u(t), represented by the abscissa 13, is generated in response to the helm order. The relationship between helm order and turning moment is defined by a curve represented by the line 15. As the vehicle approaches the desired course, the helm order and turning moment are reduced until the helm order achieves a small or zero value to which the system does not respond. At this time it enters the dead-zone 17. Throughout the dead-zone the small error value persists and the ship continues along a course that crosses the desired one. The ship continues along the residual error course until the difference between the ship's heading and the desired course establishes an error large enough to remove the system from the dead-zone. The new detectable error has a sign that is opposite that of the detectable error prior to the entry into the dead-zone and turning moments back towards the desired course are generated along a curve representative by the line 19. The system will eventually enter the dead-zone again and the zig-zag course, limit cycle, shown in FIG. 5, will continue.

Assuming the curves 15 and 19 are straight lines, the dead-zone function DZ(t), provides a turning moment u(t), which may be described mathematically as follows:

$$u(t) = m_l[V(t) + b_l] \quad V(t) \leq b_l$$

$$u(t) = 0 \quad b_l < V(t) < b_r$$

$$u(t) = m_r[V(t) - b_r] \quad V(t) \geq b_r$$

where $m_l$ and $m_r$ are the slopes of lines 15 and 19, respectively, and $b_l$ and $b_r$ are abscissa intercepts of lines 15 and 19 respectively. Though the equation indicates discontinuities at $b_l$ and $b_r$, the system actually enter the dead-zone smoothly, as indicated by the arcs 21 and 23.

Figure 2:
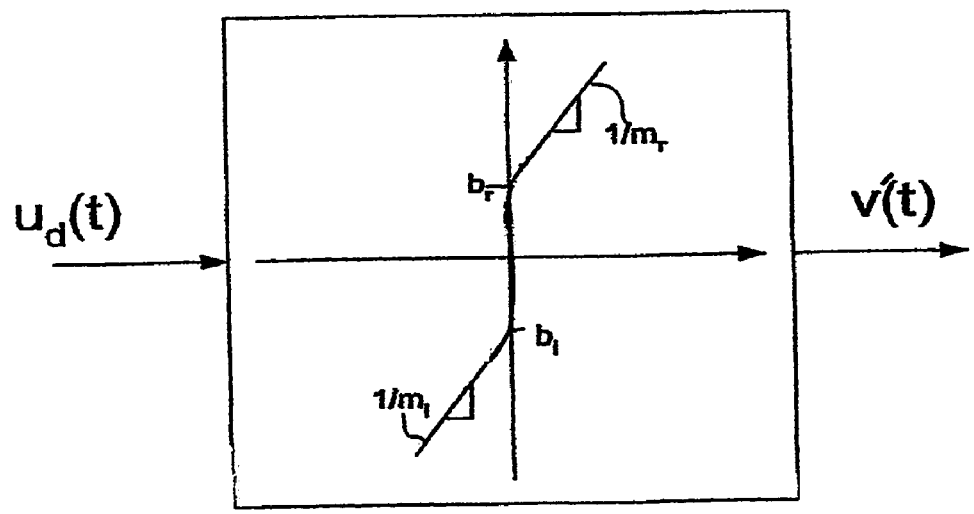
FIG. 2 is a graphical representation of a dead-zone inverse.

To compensate for the undesired effect of the dead-zone, a dead-zone inverse function DI(t), shown in FIG. 2, is implemented which provides a new helm order V'(t). Designating the desired effective turning order as $u_d(t)$, this new helm order may be represented as:

$$V'(t) = \frac{u_d(t) + m_r b_r}{m_r} \quad u_d(t) > 0$$

$$V'(t) = 0 \quad u_d(t) = 0$$

$$V'(t) = \frac{u_d(t) + m_l b_l}{m_l} \quad u_d(t) < 0$$

Figure 3:
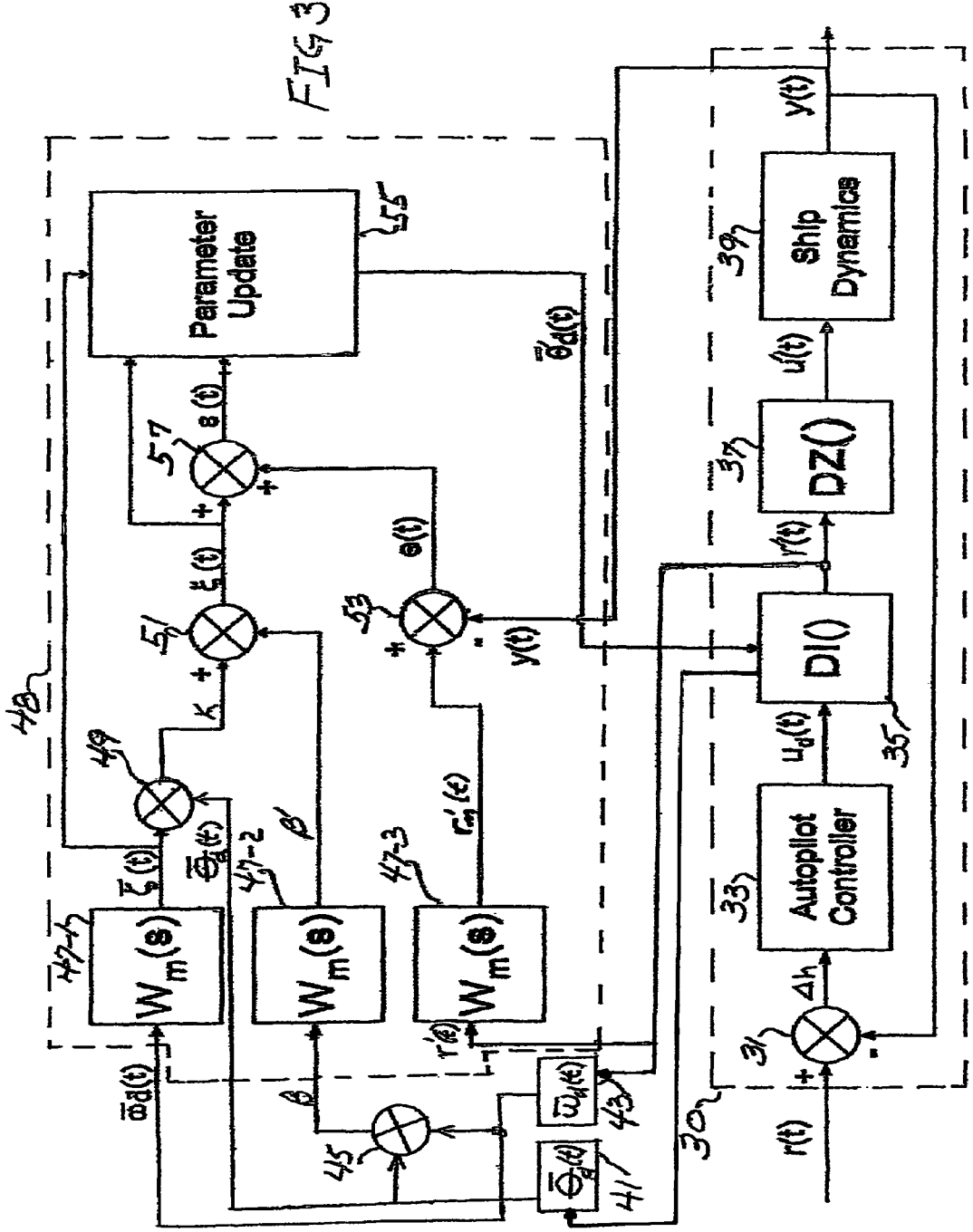
FIG. 3 is a block diagram of a preferred embodiment of the invention.

Refer now to FIG. 3, wherein a block diagram of the invention is shown. A heading order r(t) is given to the steering system 30. The actual heading of the vessel y(t) is subtracted from the heading order r(t) in a differencing network 31, wherefrom the difference Δh is coupled to an autopilot controller 33. When a dead-zone is encountered, a dead-zone steering signal $u_d(t)$ is coupled to an adaptive dead-zone inverse function generator 35 wherefrom a new heading order r'(t) is provided to the steering control system having a dead-zone characteristic DZ( ) 37. In response to the new heading order r'(t), dead-zone characteristic 37 of the steering control system causes a new turning moment u'(t) to operate on the ship dynamics 39, thereby establishing the actual heading y(t).

If the parameters of the dead-zone inverse function were known exactly at all times, the steering system 30 would need no further correction and the vessel would be turned to the desired course in response to the r(t) command. These parameters, however, are initially estimated and corrections must be made for proper system operation.

To establish corrections to the initial estimated parameters $m_r(t)$, $m_r b_r(t)$, $m_l(t)$, and $m_l b_l(t)$, dead-zone inverse function generator 35 couples these parameters to a vector generator 41 wherein a vector of these parameters is formed and the transpose, $\bar{\theta}_d^T(t) = [m_r(t) m_r b_r(t) \ m_l(t) \ m_l b_l(t)]$ is provided. Additionally, new heading order r'(t) is coupled to a second vector generator 43 which generates a vector $$\bar{\omega}_d(t) = \begin{bmatrix} xr'(t) \\ x \\ (x-1)r'(t) \\ 1-x \end{bmatrix}$$

where: x=1 when r'(t)>0 and x=0 when r'(t)<0. The transposed vector $\bar{\theta}_d^T(t)$ and the vector $\bar{\omega}_d(t)$ are coupled to a multiplier 45 wherein the multiplication $\bar{\theta}_d^T(t) \bar{\omega}_d(t)$ is performed to provide a scalar value $$\beta = m_r(t)r'(t) + m_r b_r(t)r(t) < 0$$

$$\beta = -m_l(t)r'(t) + m_l b_l(t)r(t) > 0$$

The vector $\bar{\omega}_d(t)$, scalar value $\beta$, and the new heading order r'(t) are respectively coupled to identical transform function generators $W_m(s)$ 47-1, 47-2, and 47-3 in a function operator 48, wherefrom the vector $\bar{\zeta}(t)$, the scalar β', and the transformed heading order $r'_m(t)$ are obtained.

Figure 4:
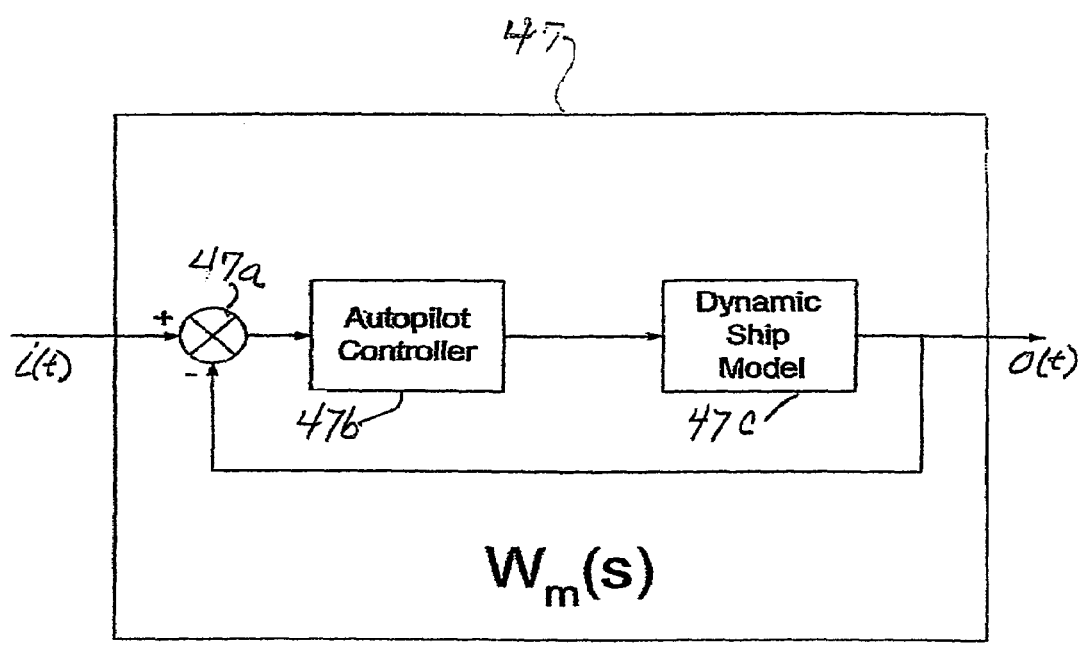
FIG. 4 is a block diagram of a transfer function generated by an autopilot controller and ship dynamics combination.

Referring to FIG. 4, transform generator $W_m(s)$ 47 provides a closed loop transfer function of the ships steering system without considering the dead-zone effect. The input signal i(t) to transfer function generator and its output signal o(t), representative of the ship's heading, are coupled to a subtraction circuit 47a, wherein o(t) is subtracted from i(t) and the difference is coupled to a simulation of the ship's autopilot controller 47b. The output signal of the autopilot controller 47b is coupled to a model of the ship's dynamic system 47c which provides the output signal that is feed back to the difference network 47a. The relationship between i(t) and o(t) is the same as the relationship between $r_m(t)$ a heading order given to the autopilot and the resulting heading $y_m(t)$ established by the steering system without dead-zone compensation.

The vector $\bar{\zeta}(t)$, resulting from the transformation of $\bar{\omega}_d(t)$, is coupled from the transformation generator 47-1 to a multiplier 49 and multiplied therein by $\bar{\theta}_d^T(t)$ to provide a scalar $k = \bar{\theta}_d^T(t)\bar{\zeta}(t)$. β', the result of the $W_m(s)$ 47-2 transformation of β, is subtracted from k in subtraction circuit 51 to obtain the scalar $\xi(t) = k - \beta'$, while the heading y(t) is subtracted from $r'_m(t)$, the result of the $W_m(s)$ 47-3 transformation of r'(t), in subtraction circuit 53 to obtain $e(t) = r'_m(t) - y(t)$. ξ(t) is coupled to a parameter update computer 55, which provides updated parameters for the dead-zone inverse function, and to an addition circuit 57 wherein it is added to e(t) to provide ε(t) which is also coupled to the computer 55, as is the vector $\bar{\zeta}(t)$ to complete the input values to the calculator 55 from which the dead-zone function parameter up-date is computed.

Computer 55 provides the parameter up-date vector $\bar{\theta}'_d(t)$ with the utilization of the following equation:

$$\bar{\theta}'_d(t) = \Gamma_d \bar{\zeta}(t)$$

in which $\Gamma_d$ is a diagonal matrix:

$$\Gamma_d = p \, diag[\gamma_1 \ \gamma_2 \ \gamma_3 \ \gamma_4]$$

where p is a scalar function given as:

$$p = \frac{\varepsilon(t)}{1 + \bar{\zeta}^T(t)\bar{\zeta}(t) + \xi^2(t)}$$

and $\gamma_1$, $\gamma_2$, $\gamma_3$, and $\gamma_4$ are positive constants chosen by the operator to give good estimation performance. These constants may be altered at any time to fine tune the operation.

Figure 5:
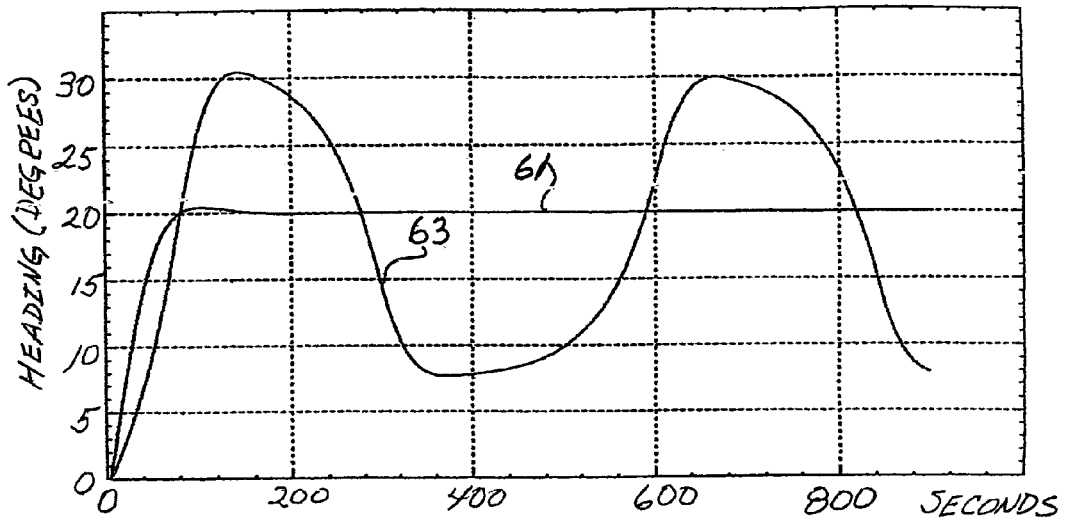
FIG. 5 is a plot of a simulated ship's response to a course order change without dead-zone compensation.

Refer to FIG. 5 wherein a plot of a simulated autopilot controlled 20 degree heading change is given for a ship with dead-zone parameters $$m_r = 1.0, \ b_r = 2.0, \ m_l = 0.75, \text{ and } b_l = -1.5$$

The desired turn is shown by the curve 61. An inspection of curve 61 indicates that the desired course is achieved in approximately 100 seconds. Without dead-zone compensation the actual course change is represented by the curve 63. An inspection of this curve indicates that the ship takes an undulating course about the desired heading with maximum course errors of approximately ±10°.

Figure 6:
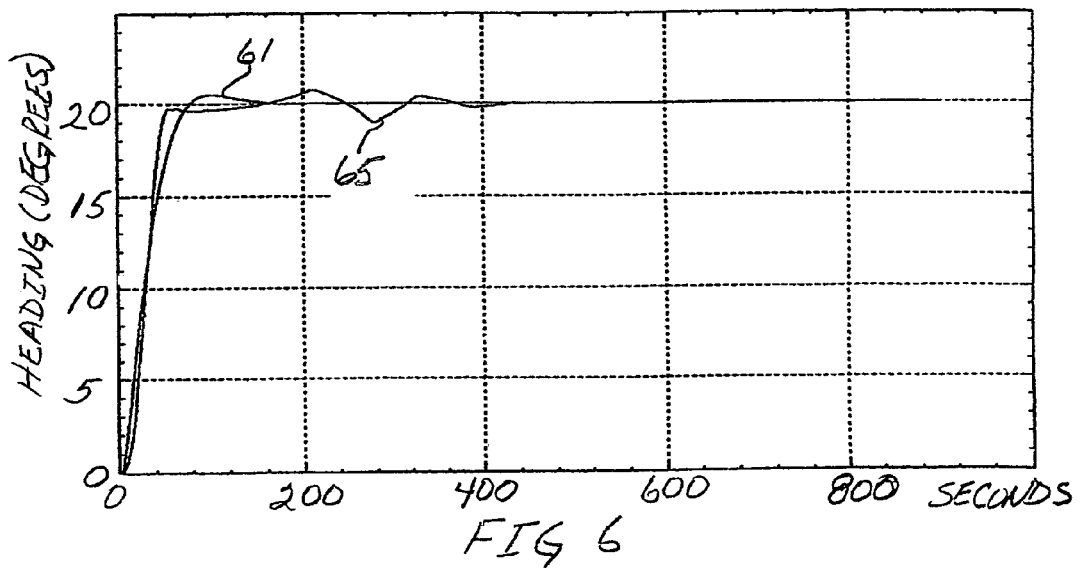
FIG. 6 is a plot of a simulated ship's response to a course order change with adaptive dead-zone compensation.

A simulation of a course change for the same dead-zone parameters with dead-zone compensation is shown in FIG. 6. In this simulation the initial dead-zone inverse parameters were chosen as:

$$m_r = 1.0, \ b_r = 0.0, \ m_l = 1, \text{ and } b_l = 0.0$$

which is a straight line with a 45° slope. Though these parameters represent an ideal situation, they do not provide the inverse function for the simulated dead-zone parameters given above. The resulting performance is represented by the curve 65. An inspection of this curve indicates that, by using the adaptive parameter updates, the desired final heading is achieved in about 400 seconds with maximum course deviations of only ±1°.

While the invention has been described in its preferred embodiments, it is to be understood that the words which have been used are words of description rather than of limitation. Thus the scope of the invention is determined by the appended claims and that changes may be made within the purview thereof without departure from the true scope and spirit of the invention in its broader aspects.

I claim:

1. A method for compensating a steering system exhibiting dead-zone characteristics, the steering system providing a heading in accordance with a heading order comprising the steps of:

estimating dead-zone parameters;

establishing a dead-zone inverse utilizing said dead-zone parameters;

modifying a heading order in accordance with dead-zone inverse parameters to provide a modified heading order;

providing said dead-zone inverse parameters in vector form, thereby supplying a first vector;

creating a vector representative of said modified heading order in vector form, thereby supplying a second vector;

multiplying said second vector by said first vector transposed to provide a scalar product;

coupling said scalar product, said modified heading order, and said second vector to transform function generators wherein said scalar product, said modified heading order and said second vector are transformed in accordance with said steering system's transfer function without dead-zone compensation, thereby providing a transformed scalar product, a transformed modified heading order, and a transformed second vector, and utilizing said transformed scalar product transformed modified Heading order and said transformed second vector to up-date said dead-zone inverse parameters.

2. A method for compensating a steering system in accordance with claim 1 further including the steps of:

multiplying said transformed second vector by said first vector transposed to provide a second scalar product;

establishing a difference between said transformed scalar product and second scalar product, thereby providing a first difference;

establishing a difference between said transformed modified heading order and an actual heading, thereby providing a second difference;

adding said first and second differences to provide a sum;

using said sum, said first difference, and said transformed second vector, to provide up-dated dead-zone inverse parameters; and up-dating said dead-zone inverse with said up-dated dead-zone inverse parameters.

3. A dead-zone parameter compensator for a dead-zone inverse function generator in a steering system, the steering system providing a heading, and wherein the dead-zone inverse function generator receives a heading order and provides a modified heading order in accordance with the dead-zone inverse function, comprising:

a first vector generator coupled to said dead-zone inverse generator to receive dead-zone estimated inverse parameters to provide a vector of said inverse parameters and a transpose thereof, thereby providing a first vector and a transposed vector;

a second vector generator coupled to receive said modified heading order from said dead-zone inverse function generator and provide a vector thereof, thereby providing a second vector;

a multiplier coupled to said first and second vector generators to multiply said transposed vector and said second vector to provide a scalar value; and a function operator coupled to receive said scalar value, said first and second vectors, said transposed vector, said modified heading order, and said heading and to provide updated dead-zone function parameters at an output coupled to said dead-zone inverse function generator, thereby updating said dead-zone function parameters.

4. A dead-zone parameter compensator in accordance with claim 3 wherein said function operator includes transform function generators coupled to receive said scalar value, and said first and second vectors wherein said scalar value, and said first and second vectors are transformed in accordance with said steering's transfer function without dead-zone compensation, thereby providing a transformed scalar value, a transformed first vector, and a transformed second vector.

5. A dead-zone parameter compensator in accordance with claim 4 wherein said function operator further includes:

a multiplier coupled to receive said transposed vector and said transformed second vector to provide a second scalar value;

a first difference means coupled to receive said second scalar value and said transformed scalar value, taking the difference therebetween to establish a third scalar value;

a second difference means coupled to receive said transformed modified heading order and said heading to provide a fourth scalar;

a summer coupled to receive said third and fourth scalars to provide a fifth scalar; and a computer coupled to receive said third and fifth scalars and said transformed second vector wherein dead-zone updated inverse parameters are determined and coupled from an output thereof to said dead-zone inverse function generator.

6. A dead-zone parameter compensator in accordance with claim 4 wherein each said transform function generators have an input port and an output port and include:

a difference means coupled to said input and output ports to provide a difference thereof;

a simulated autopilot coupled to receive said difference to provide an autopilot output in accordance therewith; and a dynamic system model coupled to receive said autopilot output to provide said output.

* * * * *